United States Patent
Ritchie et al.

(10) Patent No.: US 10,113,362 B2
(45) Date of Patent: Oct. 30, 2018

(54) OFFSET SHAFT BEARING ASSEMBLY

(71) Applicant: TURBO DRILL INDUSTRIES, INC., Conroe, TX (US)

(72) Inventors: Sheldon Ritchie, Conroe, TX (US); Chad Feddema, Conroe, TX (US)

(73) Assignee: TURBO DRILL INDUSTRIES, INC., Conroe, TX (US)

( * ) Notice: Subject to any disclaimer, the term of this patent is extended or adjusted under 35 U.S.C. 154(b) by 176 days.

(21) Appl. No.: 15/136,520

(22) Filed: Apr. 22, 2016

(65) Prior Publication Data

US 2016/0312535 A1    Oct. 27, 2016

Related U.S. Application Data

(60) Provisional application No. 62/152,606, filed on Apr. 24, 2015.

(51) Int. Cl.
| | |
|---|---|
| *F16D 3/00* | (2006.01) |
| *E21B 4/00* | (2006.01) |
| *F16D 3/16* | (2006.01) |
| *F16C 33/04* | (2006.01) |
| *F16C 17/10* | (2006.01) |
| *F16C 23/04* | (2006.01) |

(52) U.S. Cl.
CPC ............ *E21B 4/003* (2013.01); *F16C 17/105* (2013.01); *F16C 33/043* (2013.01); *F16D 3/16* (2013.01); *F16C 23/043* (2013.01); *F16C 2352/00* (2013.01)

(58) Field of Classification Search
CPC ...................................................... E21B 4/003
USPC ......................................................... 175/107
See application file for complete search history.

(56) References Cited

U.S. PATENT DOCUMENTS

| | | | |
|---|---|---|---|
| 1,963,040 A | 6/1934 | Wommer | |
| 4,035,044 A | 7/1977 | Miyazaki | |
| 6,092,610 A | 7/2000 | Kosmala et al. | |
| 2001/0052427 A1* | 12/2001 | Eppink | E21B 4/006 |
| | | | 175/40 |
| 2010/0000794 A1 | 1/2010 | Hall et al. | |
| 2013/0168152 A1 | 7/2013 | Panahi | |
| 2014/0048285 A1* | 2/2014 | Sihler | H01R 39/643 |
| | | | 166/378 |

FOREIGN PATENT DOCUMENTS

WO   2014099789 A1   6/2014

OTHER PUBLICATIONS

International Search Report and Written Opinion issued in PCT/US16/28978, dated Jul. 29, 2016 (9 pages).

* cited by examiner

*Primary Examiner* — Taras P Bemko
(74) *Attorney, Agent, or Firm* — Adolph Locklar

(57) ABSTRACT

An offset shaft bearing assembly includes a drive shaft extending through an outer housing. The drive shaft centerline is at an angle to the centerline of the outer housing. The shaft is coupled to the outer housing by radiused conical bearings which act as thrust and radial bearings. At least one of the radiused conical bearings is offset from the centerline of the outer housing. The radiused conical bearings may include a curved bearing surface, allowing the radiused conical bearings to operate despite angular misalignment.

34 Claims, 13 Drawing Sheets

OFFSET SHAFT BEARING ASSEMBLY

CROSS-REFERENCE TO RELATED APPLICATIONS

This application is a non-provisional application which claims priority from U.S. provisional application No. 62/152,606, filed Apr. 24, 2015, which is incorporated by reference herein in its entirety.

TECHNICAL FIELD/FIELD OF THE DISCLOSURE

The present disclosure relates generally to bearing assemblies, and specifically to bearing assemblies for directional drilling.

BACKGROUND OF THE DISCLOSURE

When drilling a wellbore, the drill bit may be turned by a rotation of the drill string or by a downhole motor. The downhole motor may be used to rotate the drill bit while the drill string is stationary. In such a drill string, the bottom hole assembly (BHA), located at the end of the drill string, may include the downhole motor, the drill bit, and a bearing section. The bearing section couples between the motor sub and the drill bit and houses the drive shaft which couples between the drill bit and the downhole motor. The bearing section couples to the drive shaft through one or more bearings to allow rotation of the drive shaft as the bearing section remains generally stationary within the wellbore.

SUMMARY

The present disclosure provides for an offset shaft bearing assembly for a downhole tool. The assembly may include an outer housing. The outer housing may be generally tubular and may have a housing centerline. The assembly may further include a drive shaft. The drive shaft may extend through the outer housing. The drive shaft may be generally tubular and may have a shaft centerline. The assembly may further include two or more radiused conical bearings positioned to couple the drive shaft to the outer housing while preventing longitudinal and radial movement therebetween. At least one radiused conical bearing may be offset such that the shaft centerline is at an angle to the housing centerline.

The present disclosure also provides for a method. The method may include forming an inner bore through an inner housing. The inner housing may be generally tubular and may extend along a centerline defining a housing centerline. The inner bore may have a centerline defining a shaft centerline. The shaft centerline may be at an angle to the housing centerline. The method may further include positioning a drive shaft within the inner housing. The drive shaft may be generally tubular and may extend along the shaft centerline. The method may further include coupling the drive shaft to the inner housing using two or more radiused conical bearings. The radiused conical bearings may be adapted to provide resistance to thrust and radial forces between the drive shaft and the inner housing. The method may further include coupling the inner housing to an outer housing. The outer housing may be generally tubular and may extend at least partially along the housing centerline

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
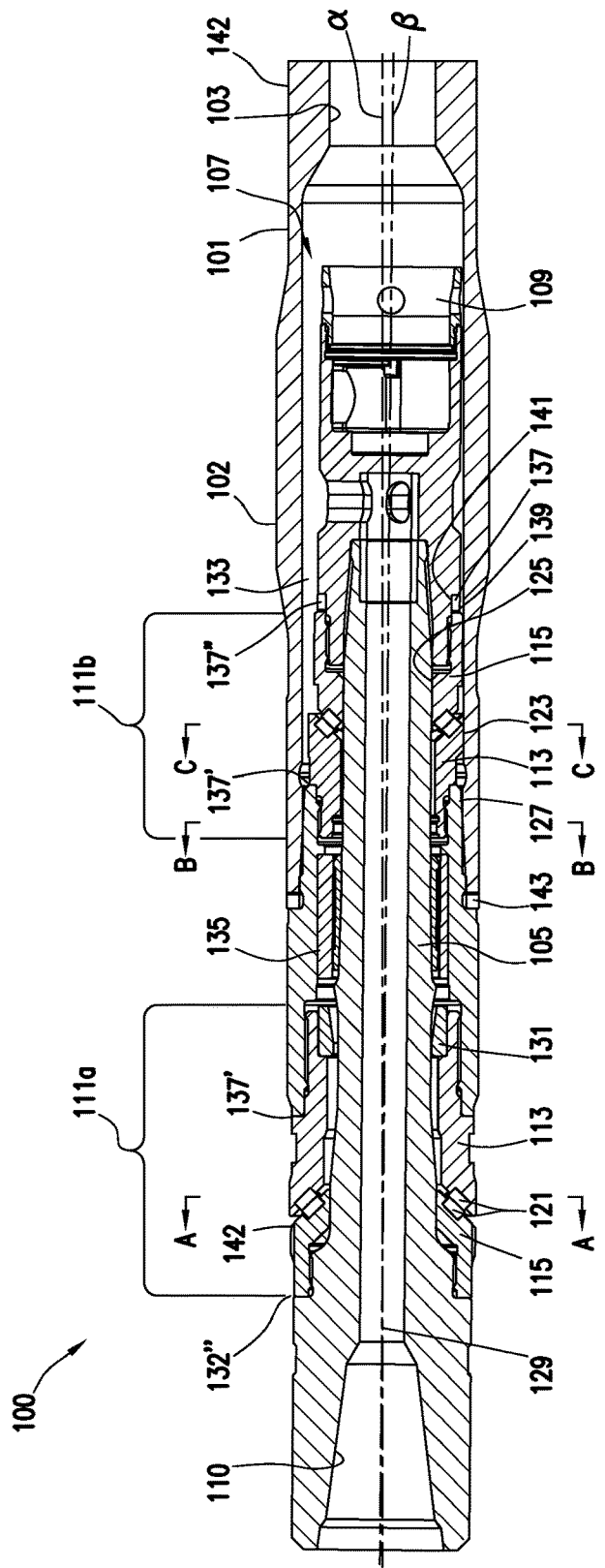
FIG. 1A depicts a cross section view of a bearing section consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In some embodiments of the present disclosure, as depicted in FIGS. 1A-D, 2A-D, a bottom hole assembly (BHA) may include offset shaft bearing assembly 100. Offset shaft bearing assembly 100 may include outer housing 101. Outer housing 101 may be generally tubular. Outer housing 101 may include one or more tubular subunits or subs to, for example and without limitation, facilitate assembly of offset shaft bearing assembly 100. One having ordinary skill in the art with the benefit of this disclosure will understand that the specific sub arrangement of outer housing 101 depicted and described herein is merely exemplary and is not intended to limit the scope of this disclosure. Outer housing 101 may include coupler 103. Coupler 103 may be adapted to couple to additional subs (not shown) of the BHA, including, for example and without limitation, a housing of a downhole motor such as a mud motor. Coupler 103 may rigidly couple outer housing 101 to the rest of the BHA. In some embodiments, outer housing 101 may be prevented from rotating within the wellbore. In some embodiments, outer housing 101 may include one or more external stabilizers 102 to, for example and without limitation, position offset shaft bearing assembly 100 within the wellbore. External stabilizers 102 may be, for example and without limitation, one or more radial protrusions, depicted in cross section in FIGS. 1A, 2A. External stabilizers 102 may be positioned and have a selected diameter depending on the wellbore in which offset shaft bearing assembly 100 is to be used.

Offset shaft bearing assembly 100 may further include drive shaft 105. Drive shaft 105 extends through inner bore 107 of outer housing 101. Drive shaft 105 may include shaft coupler 109. Shaft coupler 109 may mechanically couple to the output shaft of a downhole motor at a second end of drive shaft 105. In some embodiments, shaft coupler 109 may mechanically couple to the output shaft of a mud motor through a transmission shaft. In some embodiments, shaft coupler 109 may include a constant velocity joint adapted to allow the output shaft of the motor to couple to drive shaft 105. Drive shaft 105 may further include bit coupler 110 at a first end of drive shaft 105. Bit coupler 110 may mechanically couple to a drill bit by, for example and without limitation, a box and pin joint.

Figure 3:
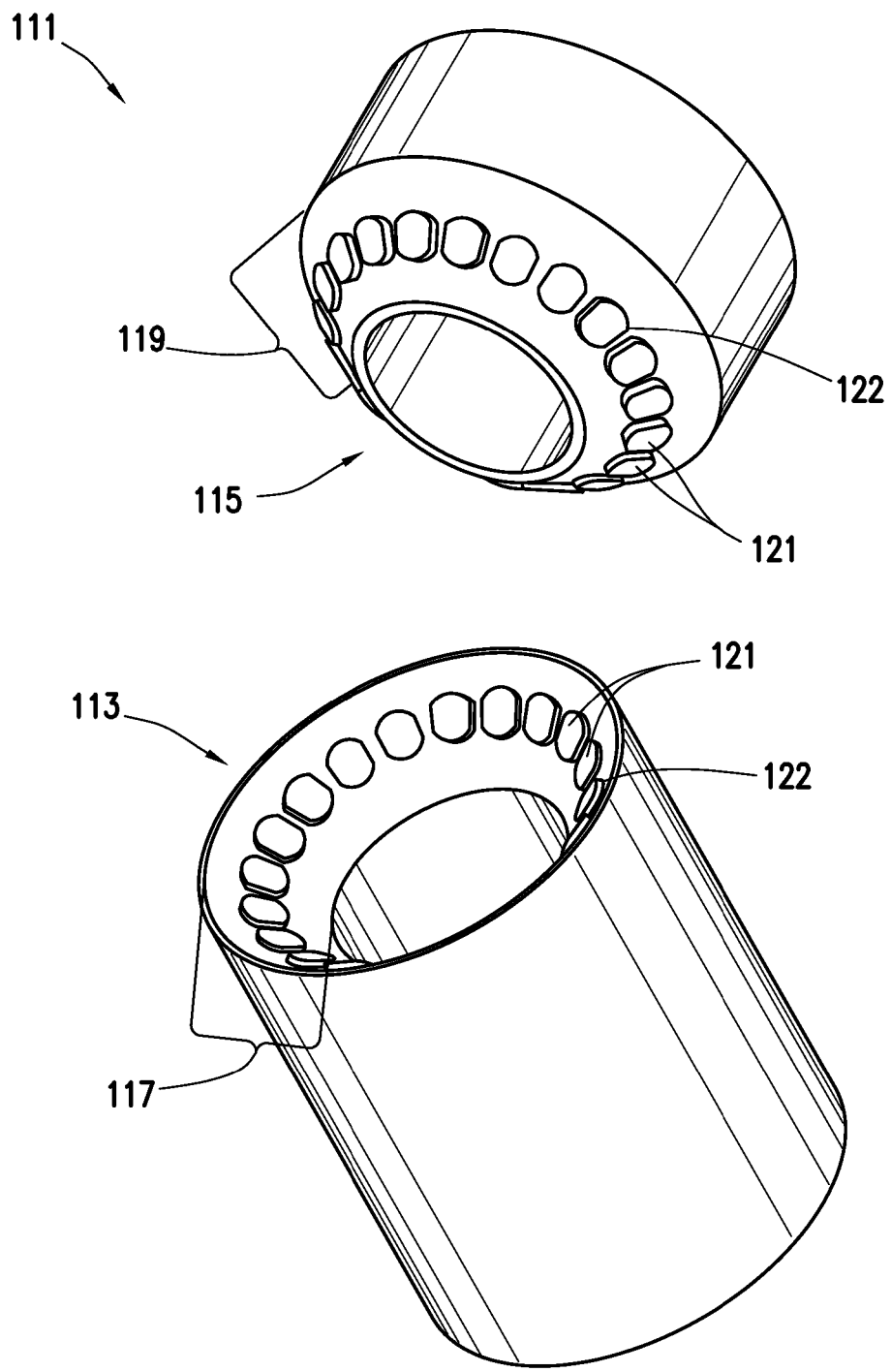
FIG. 3 depicts a partial view of a radiused conical bearing of a bearing section consistent with at least one embodiment of the present disclosure.

In some embodiments, drive shaft 105 may be coupled to outer housing 101 by one or more bearings 111a, b. In some embodiments, bearings 111a, b may be radiused conical bearings, also referred to in the art as angle, taper, or cup/cone bearings. Radiused conical bearings, as depicted in FIG. 3, may include cup portion 113 and cone portion 115. Cup portion 113 and cone portion 115 may be generally annular and adapted to contact at bearing surfaces 117 and 119 respectively. Bearing surfaces 117 and 119 may be generally frustoconical in shape, allowing bearings 111a, b to resist longitudinal or thrust loading as well as radial loading between cup portion 113 and cone portion 115 while allowing relative rotation between cup portion 113 and cone portion 115. Bearing surfaces 117, 119 may be radiused such that bearing surfaces 117, 119 are in contact. In some embodiments, bearing surfaces 117, 119 may remain in contact despite angular misalignment between cup portion 113 and cone portion 115, allowing bearings 111a, b to function with an angle between drive shaft 105 and outer housing 101. Furthermore, the ability of bearings 111a, b to function through continuous angular offsets allows the same bearings 111a, b to be utilized as a part of offset shaft bearing assembly 100 with any desired angular offset as discussed below. Bearings 111a, b may thus act as both thrust and radial bearings. In some embodiments, bearing surfaces 117 and 119 may include one or more bearing elements 121 adapted to reduce wear on cup portion 113 and cone portion 115. In some embodiments, bearing elements 121 may be polycrystalline diamond compacts.

In some embodiments, bearings 111a, b may include generally cylindrical outer surface 123 and generally cylindrical inner surface 125. Outer surface 123 may serve to couple between or align bearings 111a, b with outer housing 101 and inner surface 125 may serve to couple between or align bearings 111a, b with drive shaft 105. In some embodiments, bearing surfaces 117 and 119 may be curved or radiused such that bearing surfaces 117 and 119 remain in contact despite angular misalignment between cup portion 113 and cone portion 115, thus allowing rotation of drive shaft 105 relative to outer housing 101 while drive shaft 105 is at an angle thereto.

As depicted in FIGS. 1A-D, 2A-D, in some embodiments, the cup portion 113 of each bearing 111a, b may be coupled to outer housing 101 and the cone portion 115 may be coupled to drive shaft 105. As understood by one having ordinary skill in the art with the benefit of this disclosure, cup portions 113 may instead be coupled to drive shaft 105 and cone portions 115 may be coupled to outer housing 101 without deviating from the scope of this disclosure. Bearings 111a, b may be positioned such that they retain drive shaft 105 both longitudinally and radially. In some embodiments, bearings 111a, b may thus be oriented in opposing directions. Although described herein as utilizing two bearings 111a, b, one having ordinary skill in the art with the benefit of this disclosure will understand that any number of bearings 111a, b may be utilized without deviating from the scope of this disclosure.

Figure 1B:
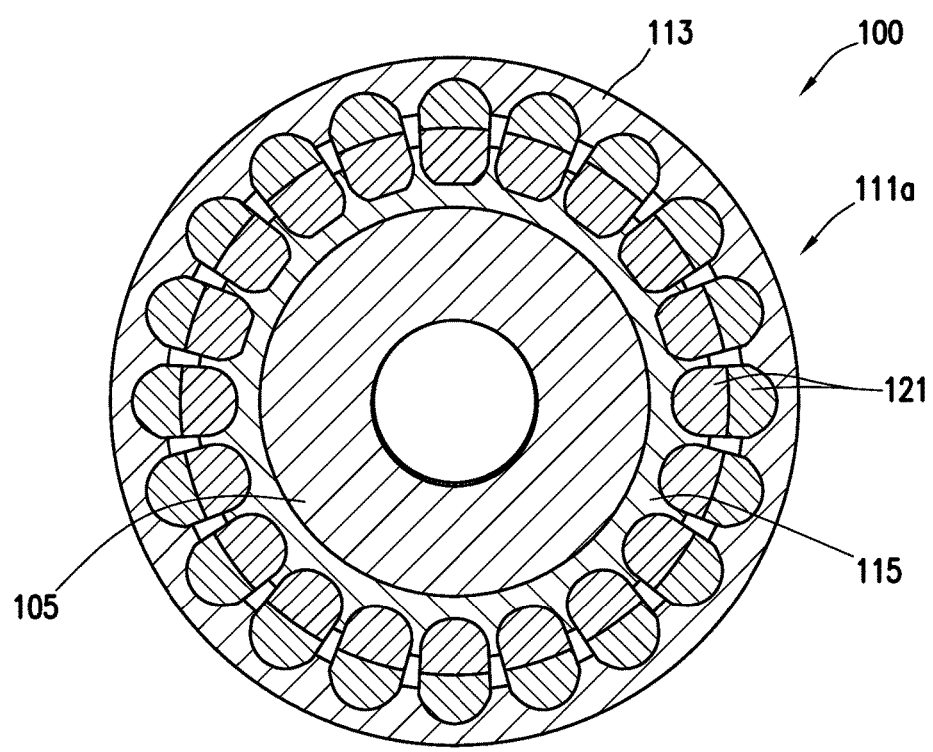
FIG. 1B depicts a cross section of the bearing section of FIG. 1A taken at line A-A.

In some embodiments, one or more of bearings 111a, b may be offset from the housing centerline α of outer housing 101, designated as α. FIGS. 1A, 2A depict bearing 111b as being offset (FIGS. 1D, 2D) and bearing 111a as being centered (FIGS. 1B, 2B). One having ordinary skill in the art with the benefit of this disclosure will understand that both bearings 111a, b or bearing 111a alone may be offset without deviating from the scope of the present disclosure.

Figure 1C:
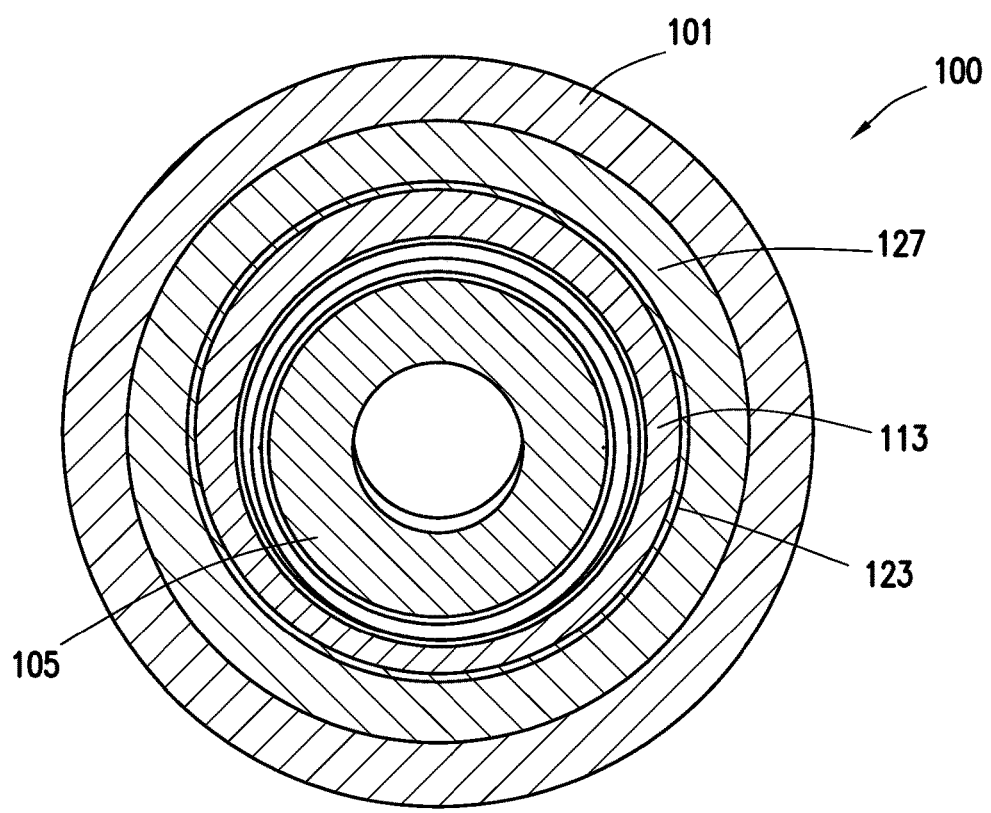
FIG. 1C depicts a cross section of the bearing section of FIG. 1A taken at line B-B.
Figure 1D:
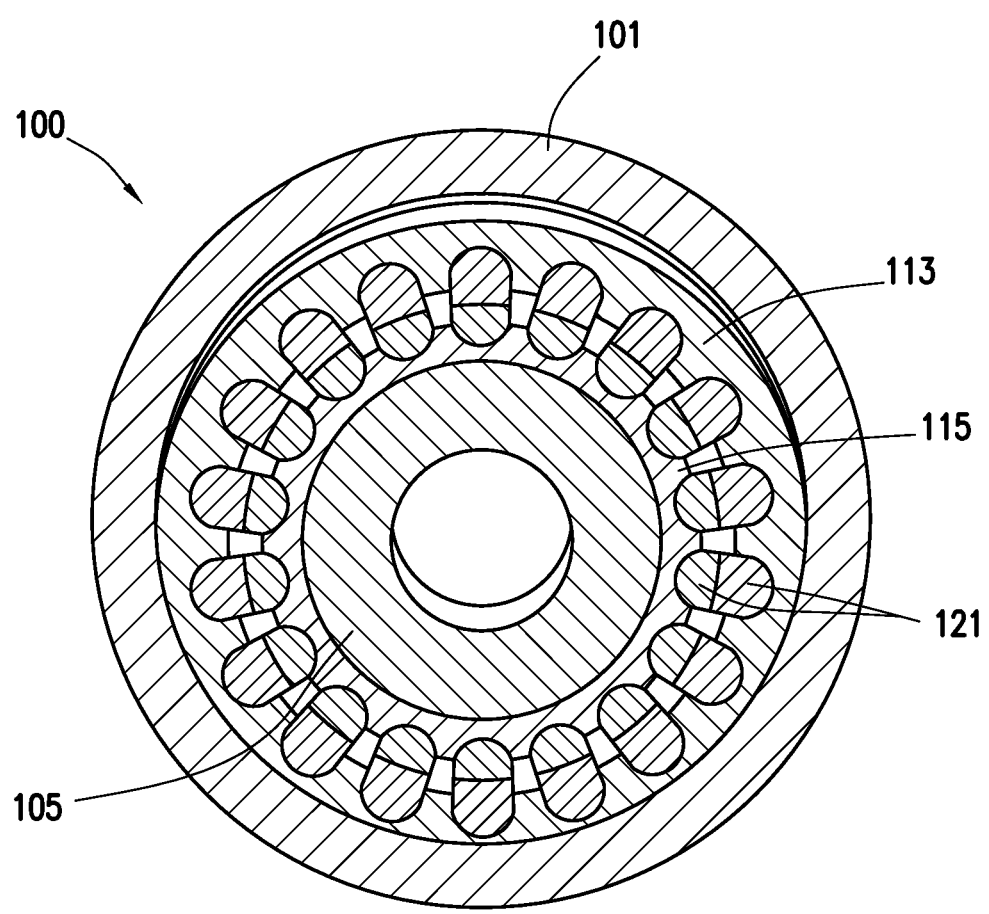
FIG. 1D depicts a cross section of the bearing section of FIG. 1A taken at line C-C.
Figure 2A:
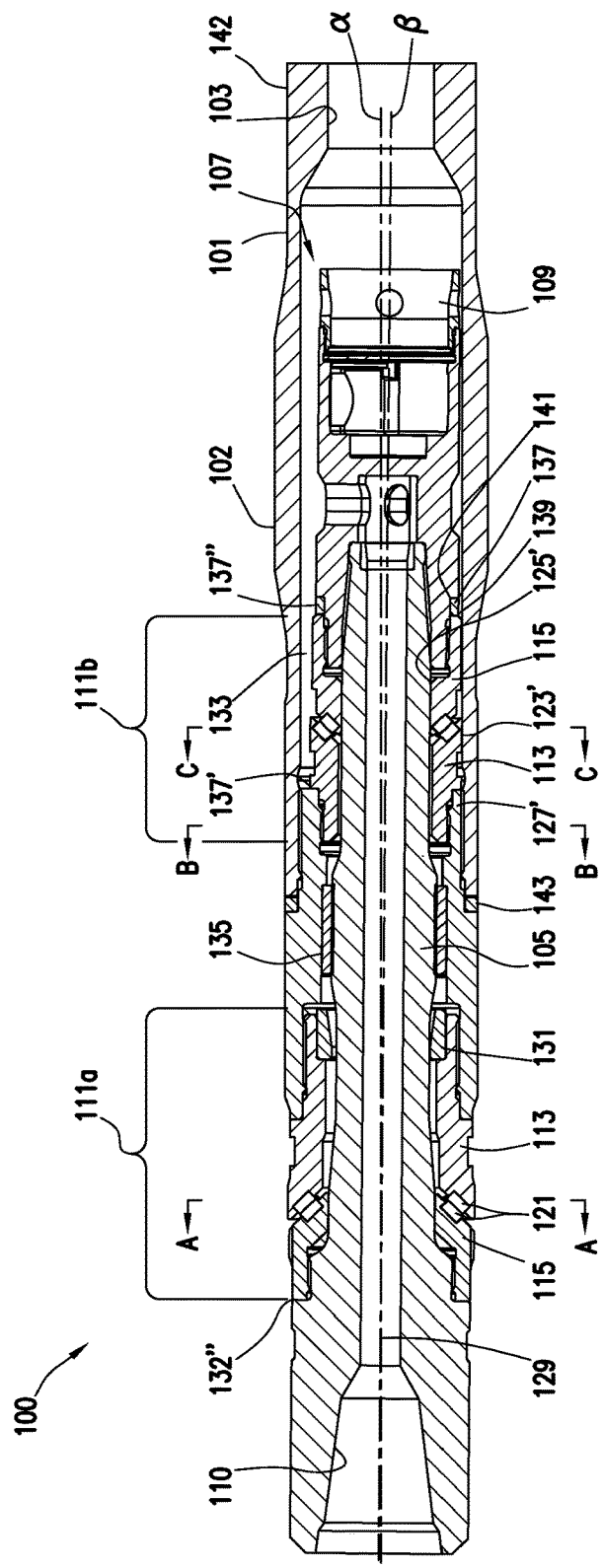
FIG. 2A depicts a cross section view of a bearing section consistent with at least one embodiment of the present disclosure.
Figure 2B:
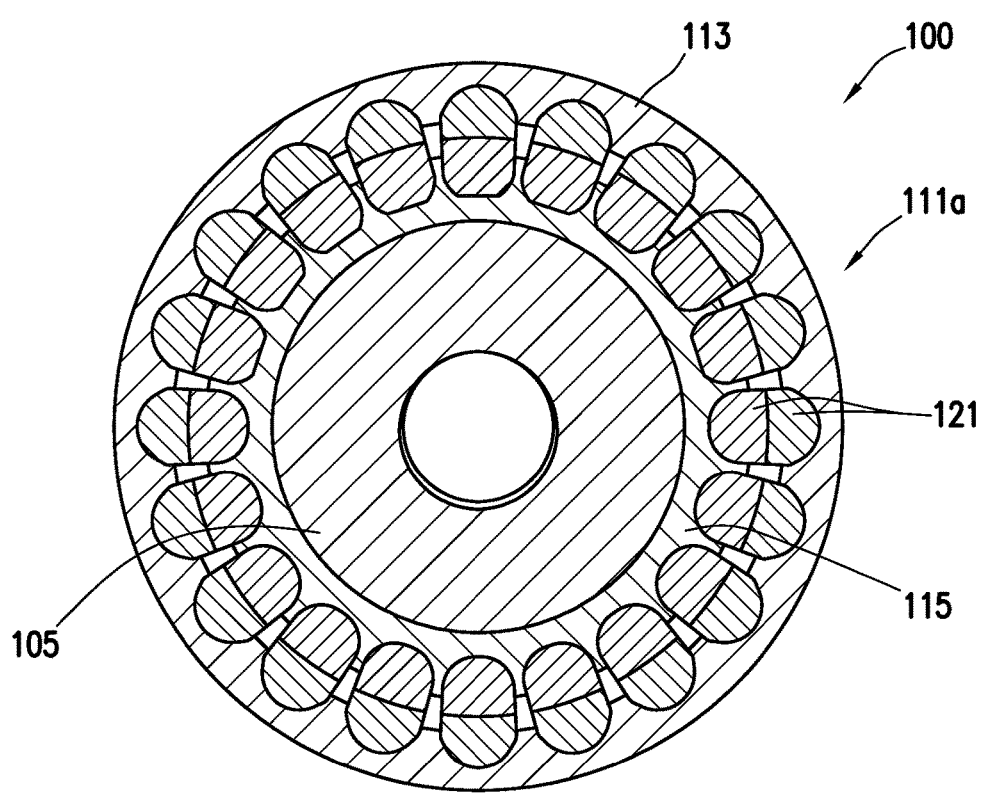
FIG. 2B depicts a cross section of the bearing section of FIG. 2A taken at line A-A.

In other embodiments, as depicted in FIGS. 1A, 1C, 1D, bearing 111b may be formed eccentrically. In such an embodiment, outer surface 123 of bearing 111b may be parallel to but nonconcentric with inner surface 125. In such an embodiment, bearing mount 127 may be concentric with the housing centerline α of outer housing 101.

Figure 2C:
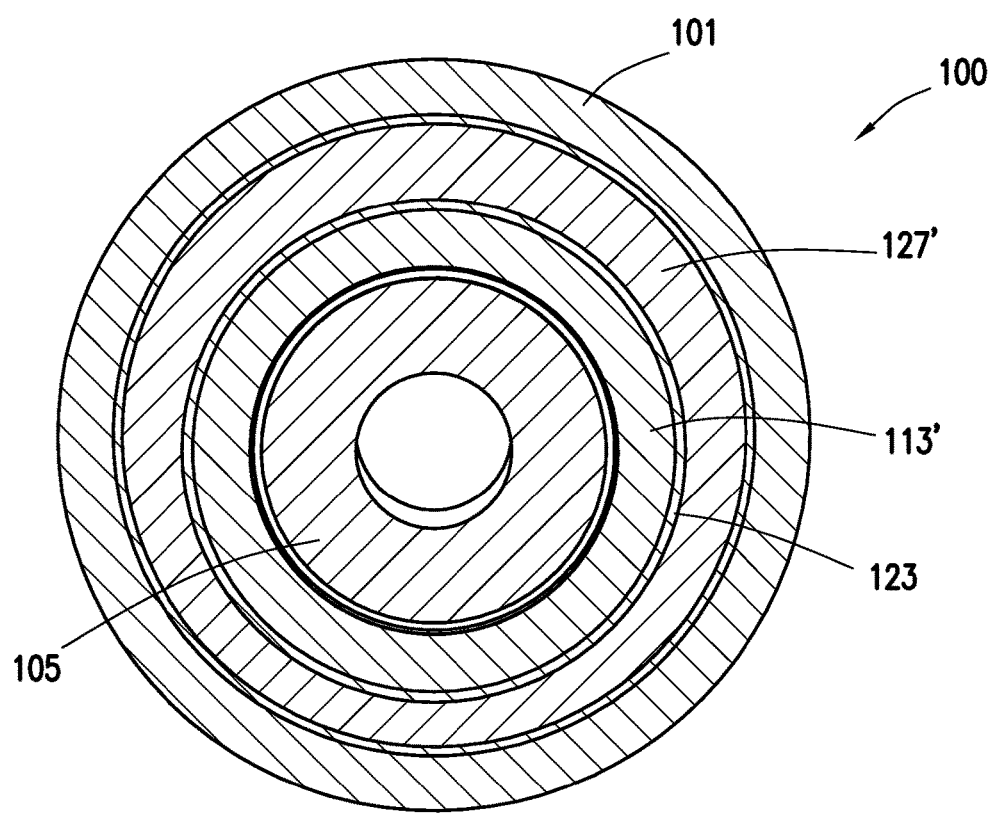
FIG. 2C depicts a cross section of the bearing section of FIG. 2A taken at line B-B.
Figure 2D:
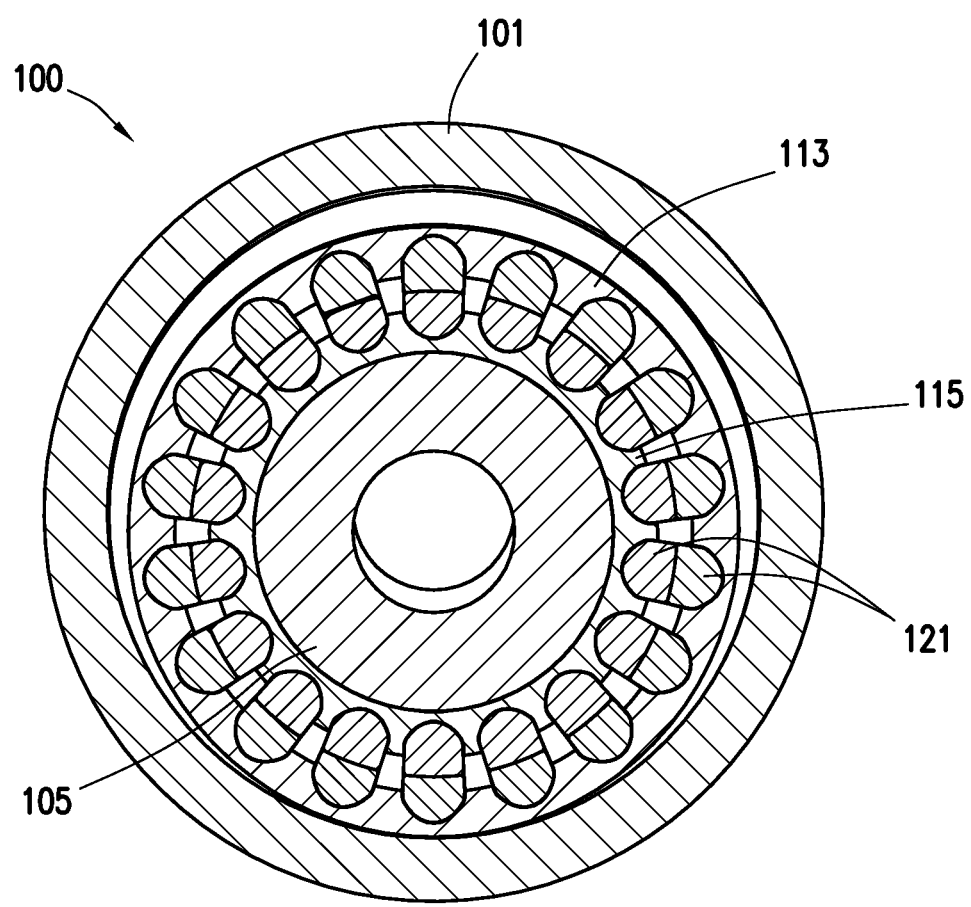
FIG. 2D depicts a cross section of the bearing section of FIG. 2A taken at line C-C.

In some embodiments, as depicted in FIGS. 2A, 2C, 2D, outer surface 123' of bearing 111b may be concentric with inner surface 125'. Bearings 111b may be coupled to outer housing 101 by offset bearing mount 127'. Offset bearing mount 127' may be formed eccentrically such that the centerline of bearing 111b is offset from housing centerline α of outer housing 101, thus positioning drive shaft 105 (defining shaft centerline β) at an angle to housing centerline α. Bearings 111a, b may thus be formed as standard radiused conical bearings including no eccentricity. In some embodiments, offset bearing mount 127' may be formed such that inner surface 128' is parallel to but nonconcentric with outer surface 130'. In some embodiments, offset bearing mount 127' may be formed such that inner surface 128' is at an angle to outer surface 130'.

As depicted in FIGS. 1A, 2A, by offsetting bearing 111b, drive shaft 105, having shaft centerline β, extends at an angle to housing centerline α of outer housing 101. When operated, the drill bit coupled to drive shaft 105 is pointed in the direction of shaft centerline β, causing the wellbore drilled thereby to deviate or build in the direction of offset of shaft centerline β from housing centerline α, referred to herein as the build direction. In some embodiments, the angle between housing centerline α and shaft centerline β may be between 0.1° and 3°, between 0.3° and 2°, or between 0.4° and 0.6°.

Figure 5B:
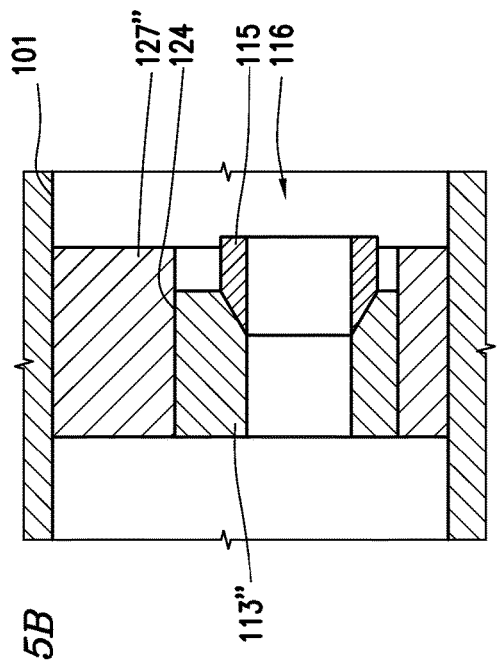
FIGS. 5A-D depict partial cross sections of a bearing held in a bearing mount consistent with at least one embodiment of the present disclosure.
Figure 5D:
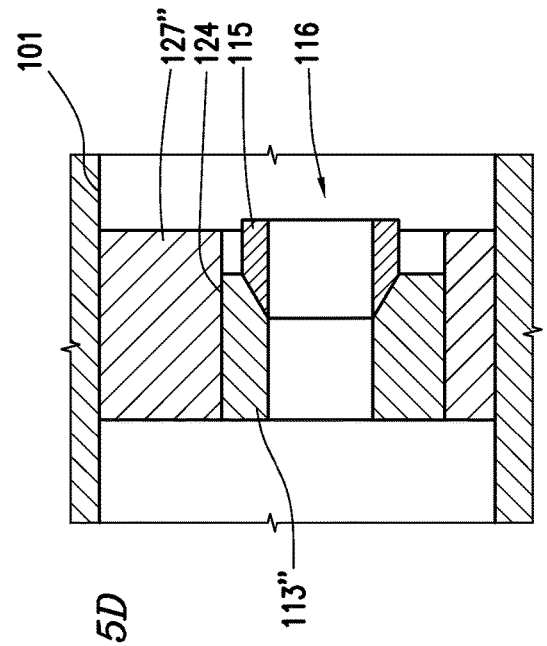
Figure 5A:
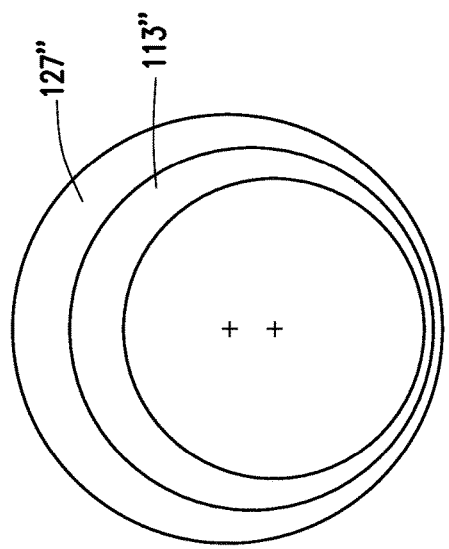
Figure 5C:
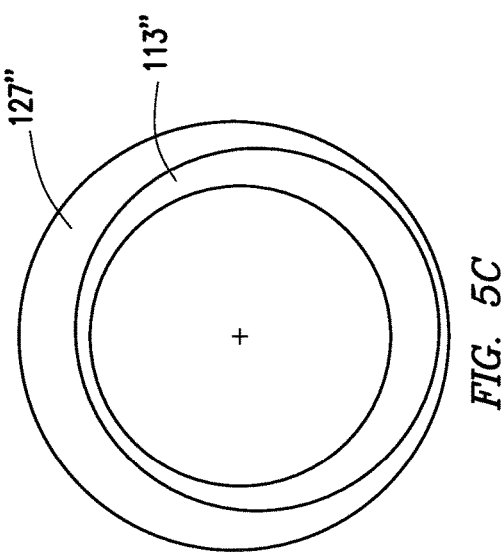

In some embodiments, as depicted in FIGS. 5A-D, both bearing 111b and bearing mount 127" may be offset. As depicted in FIGS. 5A-D, cup portion 113" may be offset as previously discussed. One having ordinary skill in the art with the benefit of this disclosure will understand that cone portion 115 may be coupled to bearing mount 127" and may be the offset portion of bearing 111b. In some embodiments, cup portion 113" may be rotatably positionable within bearing mount 127". In some embodiments, one or more rotational retention features including, for example and without limitation, cup portion 113" may include an external spline and bearing mount 127" may include an internal spline at coupling interface 124 which may, for example, allow cup portion 113" to be engaged into bearing mount 127" in various rotational positions. By positioning cup portion 113" such that the offset aligns with the offset of bearing mount 127" as depicted in FIGS. 5A, 5B, the angle of drive shaft 105 as previously discussed may be increased. Likewise, by positioning cup portion 113" such that the offset opposes that of bearing mount 127" as depicted in FIGS. 5C, 5D, the angle of drive shaft 105 may be decreased or eliminated. Furthermore, by varying the angle between the offset of cup portion 113" and bearing mount 127", the angle of drive shaft 105 may be varied.

In some embodiments, one or both of bearing mount 127" and cup portion 113" may be rotatable relative to outer housing 101. In some embodiments, one or both of bearing mount 127" and cup portion 113" may be mechanically coupled to one or more motors such as, for example and without limitation, electric motors, gearing systems, ratcheting valve systems, ramps, solenoids, pistons, or other power transmission mechanisms. The motor or motors may rotate bearing mount 127" and/or cup portion 113" to, for example and without limitation, vary the angle of drive shaft 105. In some embodiments, the motor or motors may be operable while offset shaft bearing assembly 100 is positioned in the wellbore.

In some embodiments, shaft centerline β may intersect housing centerline α of outer housing 101 at crossover point 129. In some embodiments, crossover point 129 may be positioned at an end of offset shaft bearing assembly near or at bit coupler 110. By locating crossover point 129 near the drill bit, the drill bit may remain generally centered during a rotation of the drill string. By reducing eccentricity of the drill bit, wobble or eccentric movement during rotation of the drill string may be reduced. Reducing wobble may, for example and without limitation, reduce damage to the wellbore or drill bit. Additionally, by forming outer housing 101 as a straight housing, the drill string may be capable of rotating at a higher rate than a drill string utilizing a bent sub to achieve the build angle as, for example and without limitation, eccentric rotation of bent components is eliminated, reducing damage to the wellbore and stresses imposed on the drill string. Furthermore, due to reduced stresses, rotation of the drill string may be achieved utilizing less power and lower pressure to run a mud pump to power drive shaft 105. In some embodiments, rotation rates nearly equal to straight bottom hole assemblies may be achieved without additional damage to the drill string or wellbore. For example and without limitation, the drill string including offset shaft bearing assembly 100 may be capable of reliable rotation up to 250 RPM.

In some embodiments, inner bore 107 of outer housing 101 may be angled relative to housing centerline α of outer housing 101 such that inner bore 107 is concentric with shaft centerline β.

In some embodiments, offset shaft bearing assembly 100 may include mandrel catcher 131 to, for example and without limitation, prevent drive shaft 105 from exiting outer housing 101.

In some embodiments, in order to, for example and without limitation, assist in cooling of bearing elements 121, flow path 133 may be formed between drive shaft 105 and outer housing 101. In some embodiments, flow restrictor 135 may be positioned between drive shaft 105 and outer housing 101 to, for example and without limitation, limit the flow of fluid between drive shaft 105 and outer housing 101 and reduce or prevent washout of components of offset shaft bearing assembly 100 caused by high speed fluid flow through flowpath 133. In some embodiments, bearings 111a, 111b may, as depicted in FIG. 3, include parent surface 122 between bearing elements 121. Parent surface 122 may, for example and without limitation, be formed from a material softer than bearing elements 121 and may be positioned to erode when exposed to high velocity fluid, avoiding damage to bearing elements 121. In some embodiments, parent surface 122 may be hardened by, for example and without limitation, a carbide coating.

In some embodiments, preload spacer 137 may be positioned between preloading shoulders 139, 141 positioned on outer housing 101 and drive shaft 105 respectively. Preload spacer 137 may be positioned to preload bearings 111a, b. As an example, because of the weight on the drill bit, the bearing providing thrust resistance in the direction of the drill bit, depicted in FIGS. 1A, 2A as bearing 111b, must resist a greater thrust force than the other bearing (111a). Preload spacer 137 may generally equalize loading between bearings 111a, b preventing, for example and without limitation, uneven wear between bearings 111a, b and uneven frictional characteristics. One having ordinary skill in the art with the benefit of this disclosure will understand that although depicted at a specific location along offset shaft bearing assembly 100, preload spacer 137 and preloading shoulders 139, 141 may be positioned between any components of offset shaft bearing assembly 100 capable of inducing the preloading as described without deviating from the scope of this disclosure. Other exemplary locations at which preload spacer 137 may be positioned include, for example and without limitation, between outer housing 101 and bearings 111a, b (denoted as 137' in FIG. 1A) or between drive shaft 105 and bearings 111a, b (denoted as 137" in FIG. 1A).

In some embodiments, offset shaft bearing assembly 100 may include an indication of the offset direction of shaft centerline β from housing centerline α. The indication may, for example and without limitation, allow an operator to identify the build direction or toolface of the BHA including offset shaft bearing assembly 100. In some embodiments, offset shaft bearing assembly 100 may include one or more scribe lines 142.

Figure 4A:
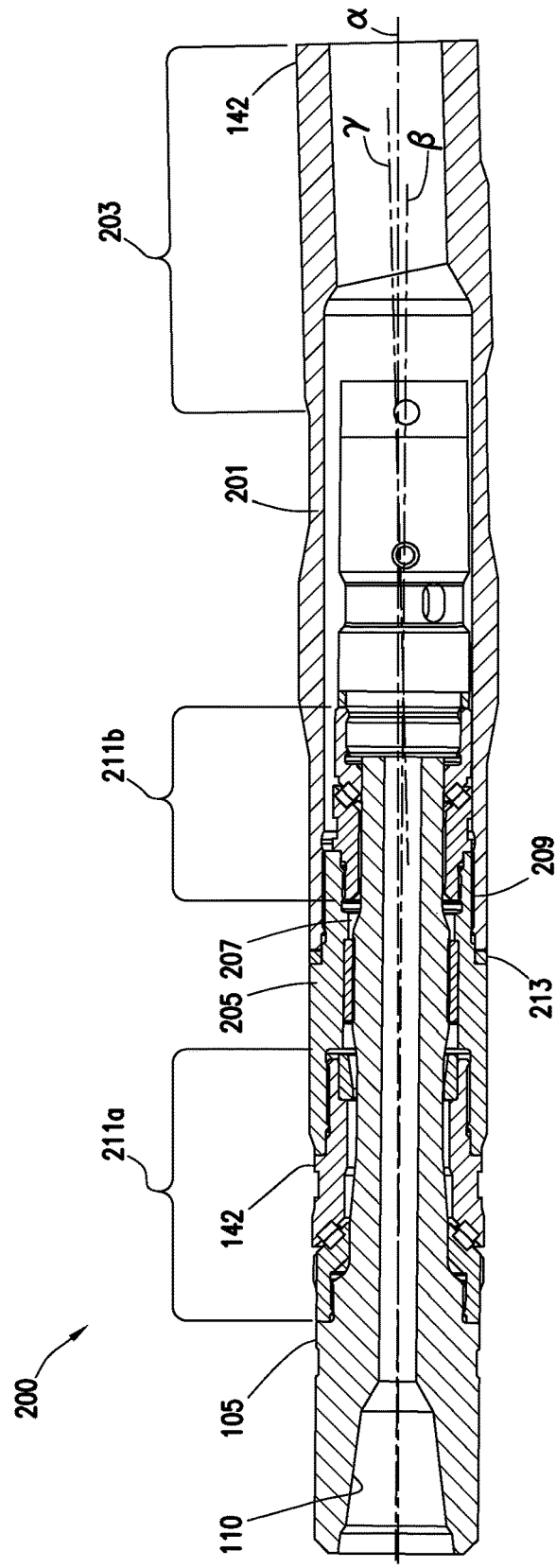
FIGS. 4A, 4B depict a bearing section consistent with at least one embodiment of the present disclosure.

In some embodiments, the build rate of offset shaft bearing assembly 200 may be further increased by positioning a bent housing as understood in the art between the motor and offset shaft bearing assembly. As depicted in FIGS. 4A, B, offset shaft bearing assembly 200 may include bent outer housing 201. Bent outer housing 201 may, for example and without limitation, include bent portion 203. Bent portion 203 may be adapted to couple to the rest of the drill string to, for example and without limitation, further increase the build angle of drive shaft 105. In some embodiments, bent portion 203 may include a bend angle between 0.1° and 5°, between 0.3° and 3°, or between 0.4° and 1°. FIG. 4A depicts the centerline of drill string as drill string centerline γ, offset from both housing centerline α and shaft centerline β. Bent portion 203 may be fixed or adjustable without deviating from the scope of this disclosure.

In some embodiments, bent outer housing 201 may couple to inner housing 205. Inner housing 205 may include inner bore 207 formed at an angle to housing centerline α as previously described which defines shaft centerline β. Inner housing 205 may be coupled to bearings 211a, b. In some embodiments, inner housing 205 may couple to bent outer housing 201 by threaded coupler 209. In order to align or clock the bend of bent outer housing 201 with the build angle of inner housing 205, timing spacer 213 may be positioned between bent outer housing 201 and inner housing 205 in threaded coupler 209. In some embodiments, timing spacer 213 may be a ring or washer of a specific width such that when inner housing 205 is coupled onto bent outer housing 201, the bend of bent outer housing 201 and build angle of inner housing 205 are aligned while maintaining a tight threaded coupling therebetween. In some embodiments, timing spacer 213 may be one or more annular spacers, bushings, washers, or Belleville springs.

In some embodiments, offset shaft bearing assembly 200 may include bearing pad 215. Bearing pad 215 may be positioned on the exterior of bent outer housing 201 at a location opposite the toolface of offset shaft bearing assembly 200. Bearing pad 215 may, for example and without limitation, prevent rotation of offset shaft bearing assembly 200 within the wellbore and reduce wear on offset shaft bearing assembly 200 during drilling operations.

Figure 4B:
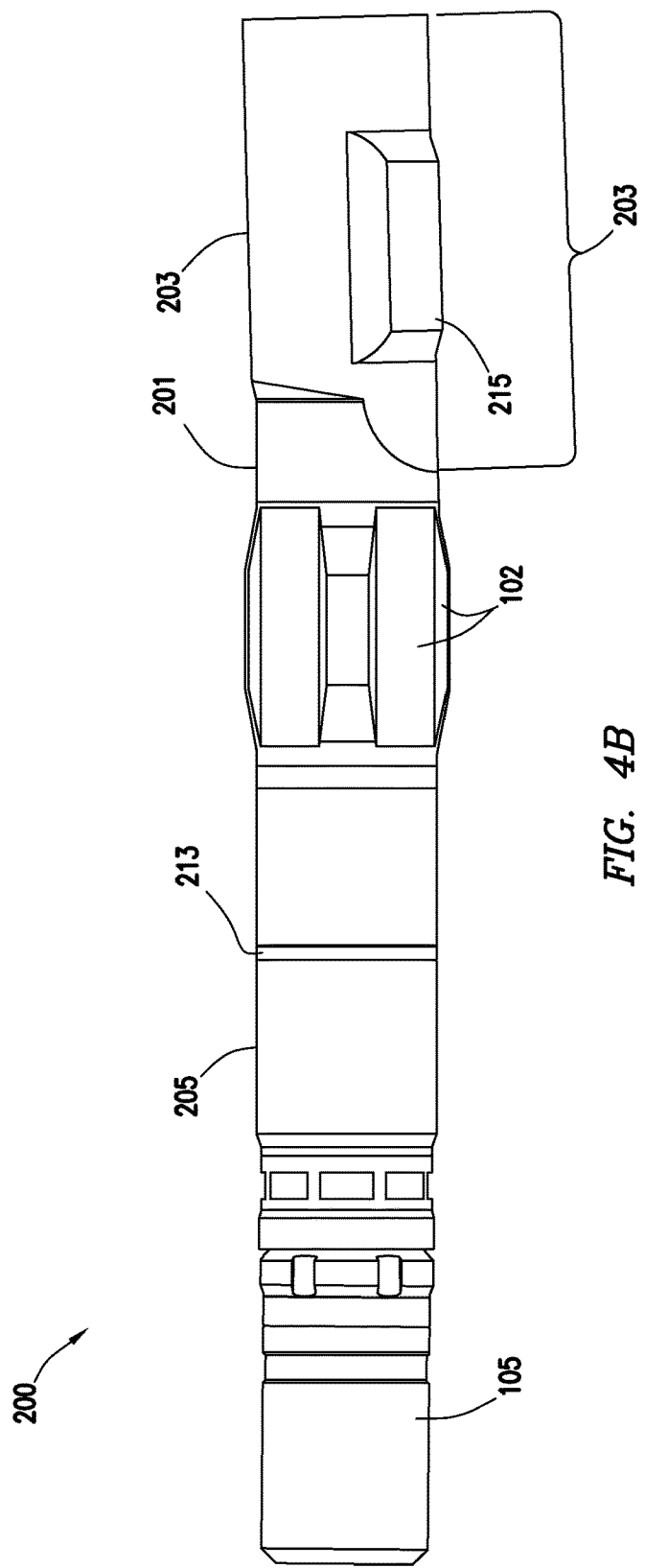

With reference to FIGS. 4A, 4B, in order to form offset shaft bearing assembly 200, inner bore 207 may be formed in inner housing 205. Inner bore 207 may be formed by any method including, for example and without limitation, milling, boring, turning, or combinations thereof. Inner bore 207 may be formed at an angle to the housing centerline α of inner housing 205 to form shaft centerline β as discussed hereinabove. Drive shaft 105 and bearings 211a, b may be coupled to inner housing 205. As previously discussed, because of the radius of the bearing surfaces of bearings 211a, b, the same bearings 211a, b, may be utilized despite the selected angle between housing centerline α and shaft centerline β. Inner housing 205 may then be coupled to an outer housing, either a straight outer housing such as outer housing 101 as depicted in FIGS. 1A, 2A or bent outer housing 201 as depicted in FIGS. 4A, B. In some embodiments, inner housing 205 may be coupled to bent outer housing 201 utilizing a threaded coupler 209 having timing spacer 213 as described hereinabove. Timing spacer 213 may be selected such that its width allows the bend of bent outer housing 201 to align with the angle between housing centerline α and shaft centerline β.

Figure 6:
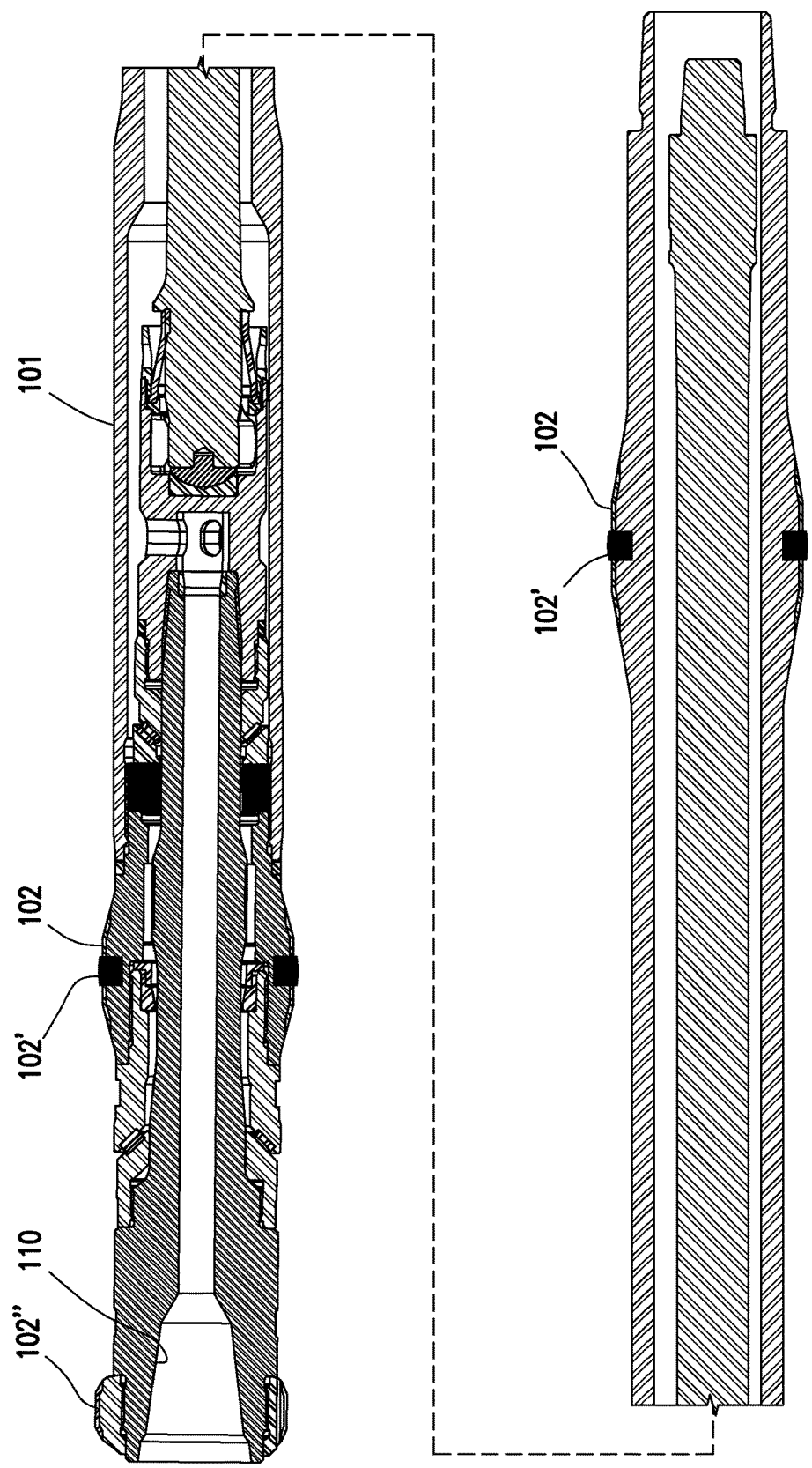
FIG. 6 depicts a cross section view of a bearing section consistent with at least one embodiment of the present disclosure.

In some embodiments, as depicted in FIG. 6, offset shaft bearing assembly 100 may include bit box stabilizer 102". Bit box stabilizer 102" may be positioned on an outer surface of offset shaft bearing assembly 100 at bit coupler 110. In some embodiments, bit box stabilizer 102" may, for example and without limitation, position offset shaft bearing assembly 100 within the wellbore. Bit box stabilizer 102" may be, for example and without limitation, one or more radial protrusions. Bit box stabilizer 102" may have a selected diameter depending on the wellbore in which offset shaft bearing assembly 100 is to be used.

In some embodiments, as depicted in FIG. 6, external stabilizers 102 may include one or more pistons 102'. Pistons 102' may, for example and without limitation, be extendable from an outer surface of external stabilizers 102. Pistons 102' may, in some embodiments, be driven hydraulically. In some embodiments, pistons 102' may be controlled by one or more valves (not shown) and may extend from offset shaft bearing assembly 100 to contact the surrounding wellbore. In some embodiments, pistons 102' may be used to vary the angle between centerline α of outer housing 101 and a centerline of the wellbore.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. An offset shaft bearing assembly for a downhole tool comprising:
    an outer housing, the outer housing having a housing centerline;
    a drive shaft, the drive shaft extending through the outer housing, the drive shaft being generally tubular and having a shaft centerline; and
    two or more radiused conical bearings positioned to couple the drive shaft to the outer housing, each radiused conical bearing having:
        an outer surface, the outer surface being generally cylindrical, the outer surface coupled to the outer housing and aligned with the housing centerline;
        an inner surface, the inner surface being generally cylindrical, the inner surface coupled to the drive shaft and aligned with the shaft centerline;
        a first bearing surface, the first bearing surface coupled to the outer surface of the bearing; and
        a second bearing surface, the second bearing surface coupled to the inner surface of the bearing, the bearing surfaces radiused such that the bearing surfaces remain in contact despite angular misalignment between the outer surface and the inner surface;
    wherein at least one radiused conical bearing is offset from the housing centerline in a direction perpendicular to the housing centerline such that the shaft centerline is at an angle to the housing centerline.

2. The offset shaft bearing assembly of claim 1, wherein the drive shaft comprises a bit coupler to mechanically couple a drill bit to a first end of the drive shaft and a shaft coupler to mechanically couple an output shaft of a mud motor to a second end of the drive shaft.

3. The offset shaft bearing assembly of claim 2, wherein the shaft coupler comprises a constant velocity joint.

4. The offset shaft bearing assembly of claim 2, wherein the shaft coupler comprises a constant velocity joint.

5. The offset shaft bearing assembly of claim 1, wherein each radiused conical bearing includes a cup portion and a cone portion, the cup portion and cone portion contacting at a radiused bearing surface.

6. The offset shaft bearing assembly of claim 5, wherein the bearing surface is radiused such that the cup portion and cone portion are in contact at the bearing surface.

7. The offset shaft bearing assembly of claim 5, wherein the cup portion and cone portion further comprise one or more polycrystalline diamond compacts.

8. The offset shaft bearing assembly of claim 5, wherein the bearing surface is radiused such that the cup portion and cone portion are in contact at the bearing surface.

9. The offset shaft bearing assembly of claim 5, wherein the cup portion and cone portion further comprise one or more polycrystalline diamond compacts.

10. The offset shaft bearing assembly of claim 1, further comprising a preload spacer, the preload spacer positioned between preloading shoulders formed on the drive shaft and the outer housing.

11. The offset shaft bearing assembly of claim 1, wherein the at least one offset radiused conical bearing is mechanically coupled to an eccentrically positioned bearing mount coupled to the outer housing.

12. The offset shaft bearing assembly of claim 1, wherein the outer surface and inner surface of the at least one offset radiused conical bearing are not concentric and the offset radiused conical bearing is mechanically coupled to a generally cylindrical bearing mount coupled to the outer housing concentric with the housing centerline.

13. The offset shaft bearing assembly of claim 1, wherein the at least one offset radiused conical bearing is mechanically coupled to an eccentrically positioned bearing mount coupled to the outer housing, the offset radiused conical bearing selectively rotationally coupleable to the bearing mount.

14. The offset shaft bearing assembly of claim 13, wherein the outer surface of the offset radiused conical bearing includes an external spline corresponding to an internal spline formed in the bearing mount to maintain the rotational position of the offset radiused conical bearing.

15. The offset shaft bearing assembly of claim 13, wherein the outer surface of the offset radiused conical bearing includes an external spline corresponding to an internal spline formed in the bearing mount to maintain the rotational position of the offset radiused conical bearing.

16. The offset shaft bearing assembly of claim 1, wherein the housing centerline and shaft centerline intersect at a crossover point.

17. The offset shaft bearing assembly of claim 16, wherein the crossover point is positioned at a position proximate to a drill bit coupled to the drive shaft.

18. The offset shaft bearing assembly of claim 16, wherein the crossover point is positioned at a position proximate to a drill bit coupled to the drive shaft.

19. The offset shaft bearing assembly of claim 1, wherein the outer housing comprises an inner bore, the inner bore of the outer housing being generally cylindrical and extending concentrically with the shaft centerline.

20. The offset shaft bearing assembly of claim 1, wherein the drive shaft comprises a bit coupler to mechanically couple a drill bit to a first end of the drive shaft and a shaft coupler to mechanically couple an output shaft of a mud motor to a second end of the drive shaft.

21. The offset shaft bearing assembly of claim 1, wherein each radiused conical bearing includes a cup portion and a cone portion, the cup portion and cone portion contacting at a radiused bearing surface.

22. The offset shaft bearing assembly of claim 1, further comprising a preload spacer, the preload spacer positioned between preloading shoulders formed on the drive shaft and the outer housing.

23. The offset shaft bearing assembly of claim 1, wherein the at least one offset radiused conical bearing comprises a generally cylindrical outer surface and a generally cylindrical inner surface, the outer surface and inner surface being concentric and the offset radiused conical bearing is mechanically coupled to an eccentrically positioned bearing mount coupled to the outer housing.

24. The offset shaft bearing assembly of claim 1, wherein the at least one offset radiused conical bearing comprises a generally cylindrical outer surface and a generally cylindrical inner surface, the outer surface and inner surface being parallel but not concentric and the offset radiused conical bearing is mechanically coupled to a generally cylindrical bearing mount coupled to the outer housing concentric with the housing centerline.

25. The offset shaft bearing assembly of claim 1, wherein the at least one offset radiused conical bearing comprises a generally cylindrical outer surface and a generally cylindrical inner surface, the outer surface and inner surface being parallel but not concentric and the offset radiused conical bearing is mechanically coupled to an eccentrically positioned bearing mount coupled to the outer housing, the offset radiused conical bearing selectively rotationably coupleable to the bearing mount.

26. The offset shaft bearing assembly of claim 1, wherein the housing centerline and shaft centerline intersect at a crossover point.

27. The offset shaft bearing assembly of claim 1, wherein the outer housing comprises an inner bore, the inner bore of the outer housing being generally cylindrical and extending concentrically with the shaft centerline.

28. A method comprising:
    forming an inner bore through an inner housing, the inner housing being generally tubular and extending along a centerline defining a housing centerline, the inner bore having a centerline defining a shaft centerline, the shaft centerline being at an angle to the housing centerline;
    positioning a drive shaft within the inner housing, the drive shaft being generally tubular and extending along the shaft centerline;
    coupling the drive shaft to the inner housing using two or more radiused conical bearings, the radiused conical bearings adapted to provide resistance to thrust and radial forces between the drive shaft and the inner housing;
    coupling the inner housing to an outer housing, the outer housing being generally tubular and extending at least partially along the housing centerline, the outer housing comprising a bent portion, the bent portion extending along a centerline defining a drill string centerline, the drill string centerline being at an angle to the housing centerline; and
    positioning a timing spacer between the inner housing and the outer housing such that when the inner housing is coupled to the outer housing, the angle between the shaft centerline and the housing centerline is aligned with the angle between the housing centerline and the drill string centerline.

29. The method of claim 28, wherein each radiused conical bearing includes a cup portion and a cone portion, the cup portion and cone portion contacting at a radiused bearing surface.

30. The method of claim 29, wherein the bearing surface is radiused such that the cup portion and cone portion remain in contact at the bearing surface.

31. The method of claim 29, wherein the cup portion and cone portion further comprise one or more polycrystalline diamond compacts.

32. The method of claim 28, further comprising positioning a preload spacer between opposing shoulders formed on the drive shaft and the inner housing, the preload spacer applying compressive loading on at least one of the bearings.

33. An offset shaft bearing assembly for a downhole tool comprising:
    an inner housing defining an inner housing centerline and having an inner bore therethrough, the inner bore defining a shaft centerline, the shaft centerline being at an angle to the inner housing centerline;
    an outer housing, the outer housing having an outer housing centerline and coupled to the inner housing such that the inner and outer housing centerlines are coincident, the outer housing including a bent portion that defines a drill string centerline, the drill string centerline being at an angle to the outer housing centerline;

a drive shaft, the drive shaft extending through the inner housing, the drive shaft being generally tubular and having a centerline, the centerline of the drive shaft coinciding with the shaft centerline; and two or more radiused conical bearings positioned to couple the drive shaft to the inner housing, the radiused conical bearings adapted to provide resistance to thrust and radial forces between the drive shaft and the inner housing, at least one radiused conical bearing being offset so as to accommodate the shaft centerline being at an angle to the housing centerline; and a timing spacer between the inner housing and the outer housing and configured such that the angle between the shaft centerline and the inner housing centerline aligns with the angle between the outer housing centerline and the drill string centerline.

34. An offset shaft bearing assembly for a downhole tool comprising:

an outer housing, the outer housing having a housing centerline;

a drive shaft, the drive shaft extending through the outer housing, the drive shaft being generally tubular and having a shaft centerline; and two or more radiused conical bearings positioned to couple the drive shaft to the outer housing, each radiused conical bearing having:

a cup portion, the cup portion having an outer surface and a first bearing surface, the outer surface being generally cylindrical, the outer surface coupled to the outer housing and aligned with the housing centerline; and a cone portion, the cone portion having an inner surface and a second bearing surface, the inner surface being generally cylindrical, the inner surface coupled to the drive shaft and aligned with the shaft centerline, the bearing surfaces radiused such that the bearing surfaces remain in contact despite angular misalignment between the cup portion and the cone portion;

wherein at least one radiused conical bearing is offset from the housing centerline in a direction perpendicular to the housing centerline such that the shaft centerline is at an angle to the housing centerline.

\* \* \* \* \*